US010512846B2

(12) United States Patent
Enomoto (10) Patent No.: US 10,512,846 B2
(45) Date of Patent: Dec. 24, 2019

(54) EMULATING PLAYER BEHAVIOR AFTER PLAYER DEPARTURE

(71) Applicant: Sony Interactive Entertainment LLC, San Mateo, CA (US)

(72) Inventor: Shigeru Enomoto, Foster City, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 15/452,443

(22) Filed: Mar. 7, 2017

(65) Prior Publication Data

US 2018/0256981 A1  Sep. 13, 2018

(51) Int. Cl.
| | |
|---|---|
| *A63F 13/67* | (2014.01) |
| *A63F 13/332* | (2014.01) |
| *A63F 13/335* | (2014.01) |
| *A63F 13/79* | (2014.01) |
| *A63F 13/49* | (2014.01) |
| *A63F 13/843* | (2014.01) |

(52) U.S. Cl.
CPC ............ *A63F 13/67* (2014.09); *A63F 13/332* (2014.09); *A63F 13/335* (2014.09); *A63F 13/49* (2014.09); *A63F 13/79* (2014.09); *A63F 13/843* (2014.09); *A63F 2300/6027* (2013.01); *A63F 2300/8088* (2013.01)

(58) Field of Classification Search
CPC ................................. A63F 13/10; A63F 13/67
USPC ..................... 463/1, 29, 31, 40–42
See application file for complete search history.

(56) References Cited

U.S. PATENT DOCUMENTS

| | | |
|---|---|---|
| 2002/0054117 A1 | 5/2002 | van Dantzich et al. |
| 2003/0045360 A1 | 3/2003 | Hora |
| 2006/0246973 A1 | 11/2006 | Thomas et al. |
| 2007/0207846 A1 | 9/2007 | Burak et al. |

(Continued)

FOREIGN PATENT DOCUMENTS

| | | |
|---|---|---|
| WO | WO 2003/012704 | 2/2003 |
| WO | WO 2018/165318 | 9/2018 |
| WO | WO 2018/165446 | 9/2018 |

OTHER PUBLICATIONS

"Is it acceptable for an AI player to take over a disconnected opponent player's game session in a multiplayer game? (From /r/nintendo)" https://web.archive.org/web/20160327230529/https://www.reddit.com/r/gamedev/comments/3wi0aj/is_it_acceptable_for_an_ai_player_to_take_over_a/, dated Dec. 13, 2015.*

(Continued)

*Primary Examiner* — David L Lewis
*Assistant Examiner* — Ross A Williams
(74) *Attorney, Agent, or Firm* — Polsinelli LLP (57) ABSTRACT

Multiplayer video games involve multiple players playing using either a single computer system or multiple computer systems connected together. While a first player of the multiplayer game is playing the multiplayer game, the first player's actions are tracked and stored. When the first player quits or stops responding before the multiplayer game has completed, the first player is replaced by a computer-simulated version of the first player that selects its actions based on probabilities calculated from the tracked actions of the first player. The multiplayer game is thus able to continue without interruption or disruption, and the first player's playstyle is preserved.

20 Claims, 8 Drawing Sheets

(56) References Cited

U.S. PATENT DOCUMENTS

| | | | |
|---|---|---|---|
| 2007/0260567 A1* | 11/2007 | Funge | ............ A63F 13/10 706/47 |
| 2008/0045335 A1 | 2/2008 | Garbow et al. | |
| 2011/0151953 A1 | 6/2011 | Kim et al. | |
| 2014/0364197 A1 | 12/2014 | Osman et al. | |
| 2014/0370992 A1 | 12/2014 | Cudak et al. | |
| 2015/0186535 A1 | 7/2015 | Patil et al. | |
| 2015/0217198 A1 | 8/2015 | Curtis et al. | |
| 2015/0363733 A1 | 12/2015 | Brown | |
| 2016/0209658 A1 | 7/2016 | Zalewski et al. | |
| 2017/0053440 A1 | 2/2017 | Yoon et al. | |
| 2017/0068311 A1 | 3/2017 | Evans | |
| 2017/0249019 A1 | 8/2017 | Sawyer et al. | |
| 2017/0282082 A1 | 10/2017 | Hubbard | |
| 2018/0088666 A1 | 3/2018 | Ayoub | |
| 2018/0256979 A1 | 9/2018 | Kunieda | |

OTHER PUBLICATIONS

Steven Rabin, "Game AI Pro: Collected Wisdom of Game AI Professionals." (Year: 2014).*

PCT Application No. PCT/US2018/021370 International Search Report and Written Opinion dated May 30, 2018.

PCT/US18/21370, Emulating Player Behavior After Player Departure, Mar. 7, 2018.

PCT Application No. PCT/US2018/021577 International Search Report and Written Opinion dated May 10, 2018.

U.S. Appl. No. 15/453,125 Final Office Action dated Nov. 2, 2018.

U.S. Appl. No. 15/453,125 Office Action dated Apr. 6, 2018.

Gordon, Whitson; "How to stop notifications from interrupting your IOS Games", How to Geek, posted May 10, 2016.

U.S. Appl. No. 15/453,125 Office Action dated Apr. 17, 2019.

U.S. Appl. 15/453,125 Final Office Action dated Oct. 18, 2019.

* cited by examiner

EMULATING PLAYER BEHAVIOR AFTER PLAYER DEPARTURE

BACKGROUND

1. Field of the Invention

The present invention generally concerns multi-player video game technologies. More particularly, the present invention concerns emulating the play style of a player after the player has departed from a game.

2. Description of the Related Art

Growing numbers of people worldwide own or have access to some kind of computer system, such as a desktop computer, a laptop computer, a mobile device, a portable video game console, or a television-connected home video game console. Many modern versions of such devices are capable of playing video games.

Video games typically involve one or more users controlling one or more characters or situations to try to achieve one or more positive outcomes and/or try to avoid one or more negative outcomes. Different genres or types of video games exist, such as racing games, adventure games, platformer games, role-playing games (RPGs), action RPGs, tactical RPGs, sandbox RPGs, first-person-shooter (FPS) games, third-person-shooter (TPS) games, strategy games, real-time strategy (RTS) games, turn-based strategy (TBS) games, real-time tactics (RTT) games, turn-bases tactics (TTT) games, tower defense games, fighting games, puzzle games, physics games, educational or "edutainment" games, sports games, simulation games, war games, adventure games, shoot-em-up games, action adventure games, construction games, management games, procedurally generated "roguelike" games, exploration games, survival games, crafting games, sandbox games, endless runner games, clicker games, stealth games, massively-multiplayer online (MMO) games, music games, party games, programming games, logic games, trivia games, board games, card games, art games, exercise games, artillery games, multiplayer online battle arena (MOBA) games, or domination games.

Some games are single-player games, or include single-player modes. These single-player games or game modes typically involve a single human player controlling some character or thing to try to achieve a particular goal or avoid a negative outcome. The single player is often pitted against computer-controlled opponents guided by artificial intelligence algorithms, and may gain assistance from computer-controlled allies also guided by artificial intelligence algorithms.

Some games are multiplayer games, or include multiplayer modes. These multiplayer games or game modes typically involve multiple human players playing together, either pitted against each other, collaborating toward a common goal, or some combination thereof. Some games involve temporary alliances between players, for example. Sometimes, multiplayer games can also involve computer-controlled opponents or allies in addition to the multiple human players.

Single-device multiplayer, sometimes referred to as "same-room multiplayer" or "split screen multiplayer," typically involves a single device, such as a home video game console connected to a television, which multiple human players are using to play a multiplayer game with. Single-device multiplayer games typically either display a view that shows every human player's character at once, or splits the display into different sections that each focus on one human player's character.

Local network multiplayer typically involves multiple computer systems, usually located near each other, connected either via a wired connection or via a local wireless connection. This includes computer systems connected via a local area network (LAN) or wireless local area network (WLAN). Typically, each human player will use a single computer system in local network multiplayer.

Online network multiplayer typically involves multiple computer systems as well, this time connected via a wired or wireless internet connection. Different human players in online network multiplayer can be on opposite sides of the world and in many cases do not know much (or anything) about each other, though often some identifying username is shown. Typically, each human player will use a single computer system in online network multiplayer.

Sometimes, one player leaves the game unexpectedly before a "round" of a game is complete, or otherwise stops inputting controls partway through a round of the game, sometimes referred to as "away from keyboard" or "afk." In many games, this can throw off the balance of the game, for example by unexpectedly removing a team member from a team. In some multiplayer video games, a single multiplayer game "round" can take several hours to complete, making this a frustrating experience for all players.

Thus, there is a need for technologies mitigating the impact of head-mounted displays.

SUMMARY OF THE PRESENTLY CLAIMED INVENTION

A first claimed embodiment of the present invention concerns a method for simulating game player behavior. The method includes receiving a plurality of action inputs from a first user device associated with a first player, the action inputs associated with a game played by the first player via the first using device, and storing the plurality of action inputs. The method also includes receiving a simulation indication identifying that the first player is relinquishing control. The method also includes identifying a first player state associated with a control object previously controlled by the first player and identifying a condition encountered by the control object. The method also includes identifying a plurality of possible actions to be taken by the control object in response to the condition and the first player state, and generating a plurality of behavior-based probability values based on the stored plurality of action inputs, each behavior-based probability value identifying how probable one of the plurality of possible actions would have been by the first player in response to the condition and the first player state. The method also includes selecting a first action of the plurality of possible actions based on the plurality of behavior-based probability values and commanding the first control object to perform the first action within the game.

A second claimed embodiment of the present invention concerns a system for simulating game player behavior. The system includes a game control interface that receives a plurality of action inputs from a first user device associated with a first player, the action inputs associated with a game played by the first player via the first using device. The system also includes a memory that stores instructions and the plurality of action inputs as well as a processor. Execution of the instructions by the processor causes the system to perform system operations. The system operations include receiving a simulation indication identifying that the first player is relinquishing control. The system operations also include identifying a first player state associated with a control object previously controlled by the first player and identifying a condition encountered by the control object. The system operations also include identifying a plurality of possible actions to be taken by the control object in response to the condition and the first player state, and generating a plurality of behavior-based probability values based on the stored plurality of action inputs, each behavior-based probability value identifying how probable one of the plurality of possible actions would have been by the first player in response to the condition and the first player state. The system operations also include selecting a first action of the plurality of possible actions based on the plurality of behavior-based probability values and commanding the first control object to perform the first action within the game.

A third-claimed embodiment of the present invention concerns a non-transitory computer readable storage medium having embodied thereon a program, wherein the program is executable by a processor to perform a program method of simulating game player behavior. The program method includes receiving a plurality of action inputs from a first user device associated with a first player, the action inputs associated with a game played by the first player via the first using device, and storing the plurality of action inputs. The program method also includes receiving a simulation indication identifying that the first player is relinquishing control. The program method also includes identifying a first player state associated with a control object previously controlled by the first player and identifying a condition encountered by the control object. The program method also includes identifying a plurality of possible actions to be taken by the control object in response to the condition and the first player state, and generating a plurality of behavior-based probability values based on the stored plurality of action inputs, each behavior-based probability value identifying how probable one of the plurality of possible actions would have been by the first player in response to the condition and the first player state. The program method also includes selecting a first action of the plurality of possible actions based on the plurality of behavior-based probability values and commanding the first control object to perform the first action within the game.

DETAILED DESCRIPTION

Multiplayer video games involve multiple players playing using either a single computer system or multiple computer systems connected together. While a first player of the multiplayer game is playing the multiplayer game, the first player's actions are tracked and stored. When the first player quits or stops responding before the multiplayer game has completed, the first player is replaced by a computer-simulated version of the first player that selects its actions based on probabilities calculated from the tracked actions of the first player. The multiplayer game is thus able to continue without interruption or disruption, and the first player's playstyle is preserved.

Figure 1A:
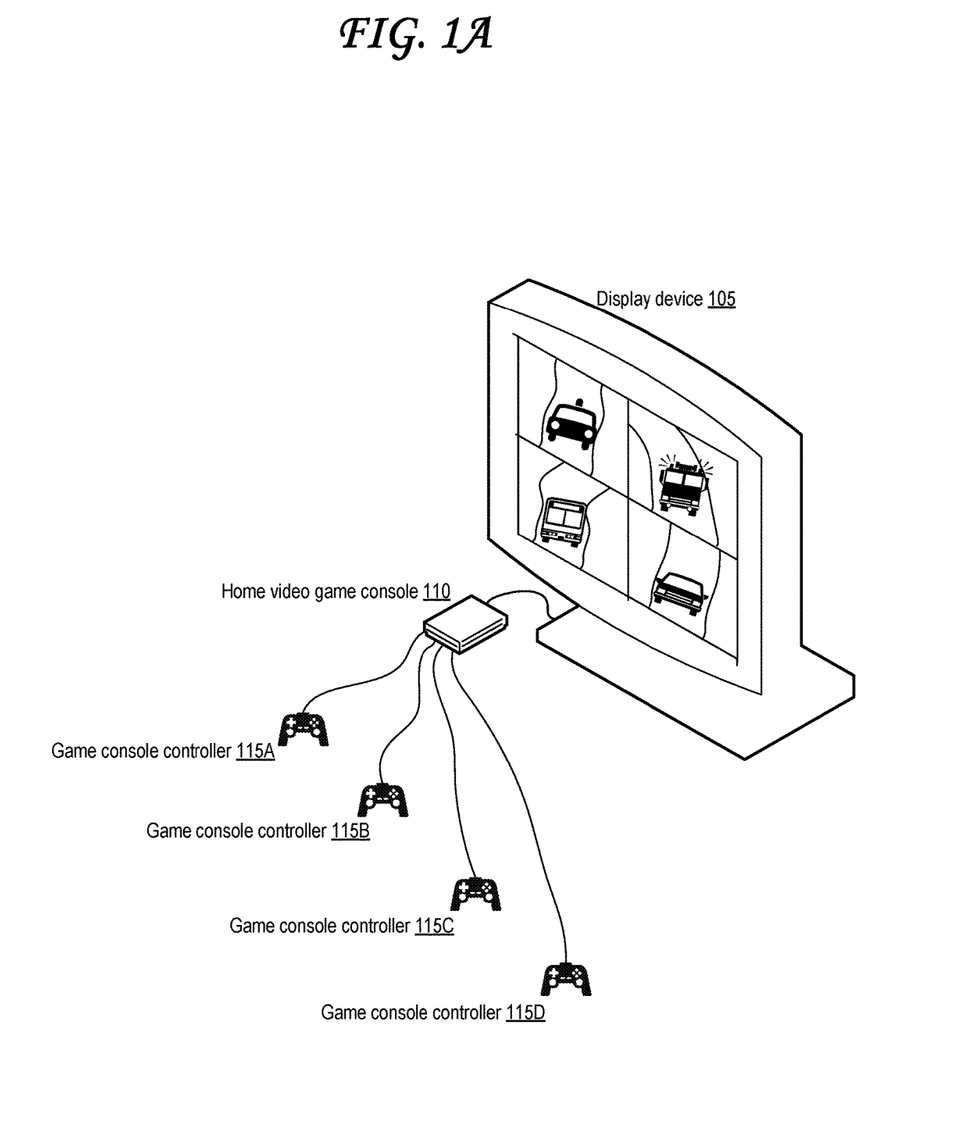
FIG. 1A illustrates a single-device multiplayer game environment based on a home video game console.

FIG. 1A illustrates a single-device multiplayer game environment based on a home video game console. A single-device multiplayer game environment is sometimes referred to as a "same-room multiplayer" or "split screen multiplayer" game environment.

The single-device multiplayer game environment of FIG. 1A includes a single computer system 600, namely the home video game console 110, which is connected to a television display device 105 and four game console controllers 115 (115A, 115B, 115C, 115D). The multiplayer game is illustrated being displayed on the display device 105 as a racing game being played in a "split-screen" fashion, that is, each player of the four players involved has a corresponding quadrant of the screen, with each quadrant showing a vehicle that the corresponding player is controlling. A split screen game involving a different number of players can splint the screen into a different number of screen portions, typically with one screen portion per player or per team of players.

While the players are playing the multiplayer game, the home video game console 110 can track the action sequences performed by each player, and the timing thereof. The home video game console 110 can track which control object the each action applied to—that is, in the racing game of FIG. 1A, each player would typically control a single control object, namely the vehicle and/or the driver of the vehicle. In a war-centric strategy game, however, each player could control a number of warriors, tanks, barracks buildings, hospitals, farms, and other units, each of which would be considered a control object. The home video game console 110 can also track various states under which each action was performed—for example, a player may drive more calmly when he/she is in first place in a racing game, but the same player may drive more nervously or desperately when he/she is in last place. Similarly, in a strategy game, the player might be more likely to perform one attack maneuver over another depending on how many warriors the player has, and how many warriors the player perceives his/her enemy to have in proportion. The home video game console 110 can also track various conditions that the player was responding to—for example, a particular player confronted with an upcoming left turn in a racing game—the upcoming left turn being the condition—may have a tendency to turn too early.

The tracked actions of each player, and all of the other information about each action, may be stored at the home video game console 110 or at another computer system 600 that is communicatively coupled to the home video game console 110, such as a game server or data server. Tracked action information can be stored permanently or temporarily. If the tracked action information is stored temporarily, it may be stored and then deleted in a first-in-first out fashion with a predetermined number of actions stored for each player, or with a predetermined number of actions stored for each state of a particular player, or with a predetermined number of actions stored for each condition responded to by the player, or some combination thereof. If the tracked action information is stored temporarily, it may be stored for a predetermined amount of time. Tracking actions temporarily has the benefits of using less memory and keeping up with a player that is improving, or getting worse, at a particular game.

A player playing in a single-device multiplayer game environment can sometimes be forced to exit a game or stop providing inputs for a variety of reasons, such as a sudden urgent phone call, a need to use the restroom, an unforeseen injury, unforeseen property damage, or an unforeseen technical failure. Unforeseen technical failures can include, for example, the player's wired controller 115 being unexpectedly disconnected from the home video game console 110, such as when someone walking in between the home video game console 110 and the controller 115 accidentally trips over the cord. Unforeseen technical failures can include battery failure in a wireless controller 115, causing sudden loss of connection between the home video game console 110 and the controller 115. Unforeseen technical failures can also include a defect in the hardware of the controller 115, a defect in the software driver interpreting the controller's inputs at the home video game console 110, a defect in the hardware of the home video game console 110, a defect in the software of the home video game console 110, a defect in the copy of the game running on the home video game console 110, or some combination thereof. Alternatively, the player can manually invoke an "autopilot mode" or simply stop providing inputs for over a predetermined period of time, sometimes referred to as "away from keyboard" or "afk."

If a particular player exits the game, triggers an "autopilot mode," or otherwise stops providing inputs, the home video game console 110 can automatically pause the game in response. Alternately or additionally, the home video game console 110 can interpret this as a "simulation indication," causing the home video game console 110 to automatically launch a "simulation mode" by taking over the role of the player who exited or otherwise stopped providing inputs to the multiplayer game. The home video game console 110 can go one step further by using the tracked action information associated with the player that it is simulating to guide the simulation to use similar in-game behaviors to the missing player.

The home video game console 110 can use various artificial intelligence artificial intelligence and/or machine learning algorithms and techniques to simulate the missing player. For example, the home video game console 110 can identify a plurality of possible actions to be taken by the control object in response to an identified condition and an identified player state, and then generate a plurality of behavior-based probability values based on the tracked and stored actions, each behavior-based probability value identifying how probable or likely it would have been for the now-missing player to have selected one of the identified possible actions in response to the identified condition and the identified player state. The home video game console 110 can identify the possible actions either by identifying all possible actions when there are not many, or by using various artificial intelligence algorithms, such as those based on pathfinding algorithms like Dijkstra's algorithm or the A* algorithm, to come up with several possible actions that the player is reasonably likely to take. The home video game console 110 can then use algorithms such as a weighted random selection algorithm or a Markov chain algorithm to select an action from the identified action for the control object to take based on the tracked player's actions in order to best simulate the player. Weighted random selection algorithms pick randomly among the possible choices, but are more likely to pick those choices assigned higher probabilities. Markov chain algorithm are typically applied to sequences of actions, and are used to determine which actions typically follow a particular action. Actions taken by the now-missing player, and by the simulation of the missing player may all be tracked, for example in a "last N actions" queue, where N is a predetermined positive integer, to feed into the Markov chain algorithm. The home video game console 110 may also determine an optimal action, or a set of actions with corresponding probabilities identifying how likely these actions are to be optimal, which it may take into account in selection of the action, for example by altering probabilities determined based on the tracked player actions, or by selecting another action that is likely to be optimal and randomly selecting between the optimal action and the action that is based on the tracked user behavior. The optimal behavior can in some cases be determined using pathfinding algorithms like Dijkstra's algorithm or the A* algorithm, and may be used to ensure that the simulation of the player does not inadvertently veer too far away from an optimal path. Alternately, the simulation may start from an optimal path, and tweak it based on the action chosen according to the tracked user behavior. Alternately, rather than employing any degree of randomness using a weighted random selection algorithm or a Markov chain algorithm, the home video game console 110 can simply choose the action it judges to be the most likely based on the highest probability that it the home video game console 110 determined using the player's tracked action information.

The home video game console 110 then commands the control object to perform the chosen action in the game, and the process repeats for all consecutive actions, at least until the game ends or the player being simulated rejoins the game. Simulation processes are further illustrated and described in the flow diagrams of FIG. 2, FIG. 3, FIG. 4, and the respective descriptions thereof.

It should also be understood that any action described as having been performed by home video game console 110 may be alternately or additionally performed by another computer system 600 in communicative contact with the home video game console 110, such as a game server or a data server. While the computer system 600 illustrated in FIG. 1A and discussed above is a home video game console 110, it should be understood that it may alternately be any other type of computer system 600 as illustrated in FIG. 600, or any device having at least a subset of the components illustrated or described with respect to FIG. 6. The home video game console 110 may be replaced with, or combined with, a desktop computer, a laptop computer, a mobile device, a smart television, a portable video game console, or any other type of computer system 600 discussed with respect to FIG. 6.

Some single-device multiplayer games do not "split" the screen into quadrants or portions, and instead zoom out to a view that shows several players, or instead allows players to take turns. It should be understood that the simulation processes discussed herein may also apply to such games.

Figure 1B:
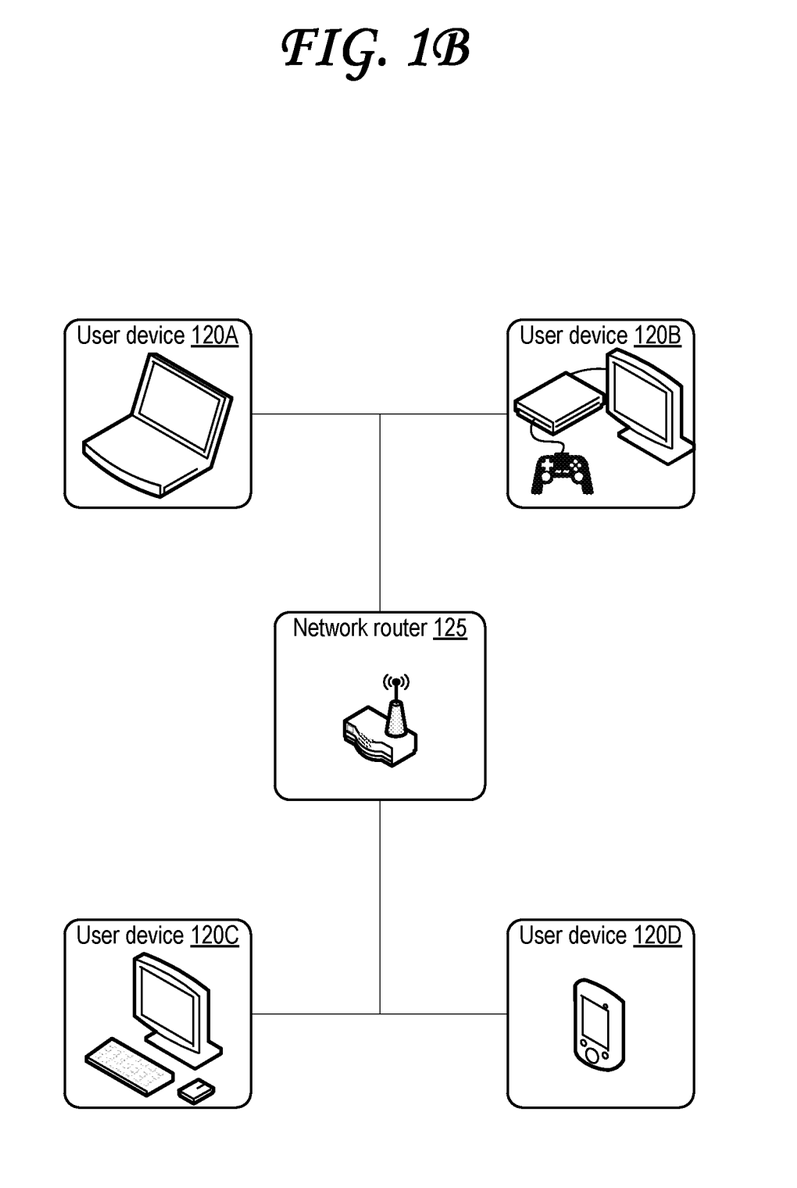
FIG. 1B illustrates a local network multiplayer game environment based on four devices connected by a network router.

FIG. 1B illustrates a local network multiplayer game environment based on four devices connected by a network router.

The local network multiplayer game environment of FIG. 1B includes four user devices 120 connected via a network router 125 and playing a multiplayer game. The four user devices 120 of FIG. 1B include a laptop 120A, a home video game console 120B, a desktop computer 120C, and a mobile device 120D. It should be understood that other local network multiplayer game environments may include a different number of user devices 120 and/or network hardware such as router(s) 125 or switches, and that any of these user devices 120 may be any type of computer system 600, or any device having at least a subset of the components illustrated or described with respect to FIG. 6. Some games may require a particular type of user device 120. The network router 125 may include wired connection capabilities via Ethernet connections between each user device 120 and the network router 125, wireless connection capabilities via 802.11 Wi-Fi connections between each user device 120 and the network router 125, or some combination thereof. In some cases, the network router 125 may be missing, and the user devices 120 may connect directly with each other via a cable, such as a universal serial bus (USB) cable, or wirelessly, such as via a Bluetooth™ connection. That is, the network router 125 and/or user devices 120 may form a personal area network (PAN), a local area network (LAN), a wireless local area network (WLAN), a municipal area network (MAN), a wide area network (WAN), or some combination thereof.

Players playing a multiplayer game in a local network multiplayer game environment are typically all running copies of the same game on each user device 120, with various actions taken by the players communicated directly from each user device 120 to the other user devices 120 via the network router 125. Actions of each particular player may be tracked as discussed with respect to FIG. 1A, though in a local network multiplayer game environment, these tracked actions for each player may be stored by multiple user devices 120, or by a data storage device communicatively coupled to the network router 125, in case one of the user devices 120 is suddenly disconnected. This prevents the tracked data for any given player from being lost.

A player playing in a local network multiplayer game environment can sometimes be forced to exit a game or stop providing inputs for a variety of reasons, such as a sudden urgent phone call, a need to use the restroom, an unforeseen injury, unforeseen property damage, or an unforeseen technical failure. Unforeseen technical failures can include, for example, a defect in the player's user device 120 hardware, a defect or crash in the player's user device 120 software, a defect or crash in a copy of the game running on the player's user device 120, insufficient computing resources (e.g., processor power, memory, storage space) on the player's user device 120, a faulty or poor connection between the player's user device 120 and the network router 125, a faulty or poor connection between the player's user device 120 and another player's user device 120, a defect in the network router 125, a defective cable between the player's user device 120 and the network router 125, a defective cable between the player's user device 120 and another player's user device 120, unexpected disconnection of a cable between the player's user device 120 and the network router 125, unexpected disconnection of a cable between the player's user device 120 and another player's user device 120, unexpected wireless signal interference, or some combination thereof. Alternatively, the player can manually invoke an "autopilot mode" or simply stop providing inputs for over a predetermined period of time, sometimes referred to as "away from keyboard" or "afk."

If a particular player exits the game, triggers an "autopilot mode," or otherwise stops providing inputs, the user device(s) 120 remaining in the local network multiplayer game environment can automatically pause the game. Alternately or additionally, the user device(s) 120 remaining in the local network multiplayer game environment can interpret this as a "simulation indication" causing the user device(s) 120 remaining in the local network multiplayer game environment to automatically launch a "simulation mode" by taking over the role of the player who exited or otherwise stopped providing inputs to the multiplayer game. The user device(s) 120 remaining in the local network multiplayer game environment can go one step further by using the tracked action information associated with the missing player to guide the simulation to use similar in-game behaviors to the missing player.

With regard to simulating the missing player, the user device(s) 120 remaining in the local network multiplayer game environment may use similar techniques to those described with respect to FIG. 1A as being performed by the home video game console 110 of FIG. 1A. In this case, however, one or more user device(s) 120 other than the user device 120 of the player who is being simulated may be driving the simulation of that player, particularly if the user device 120 of the player who is being simulated has been disconnected or has quit the game. Even if the user device 120 of the player who is being simulated has not been disconnected or has not quit the game, it is safe to assume that it may be disconnected or may quit the game at any time if the user has stopped providing inputs. Simulation processes are further illustrated and described in the flow diagrams of FIG. 2, FIG. 3, FIG. 4, and the respective descriptions thereof.

Figure 1C:
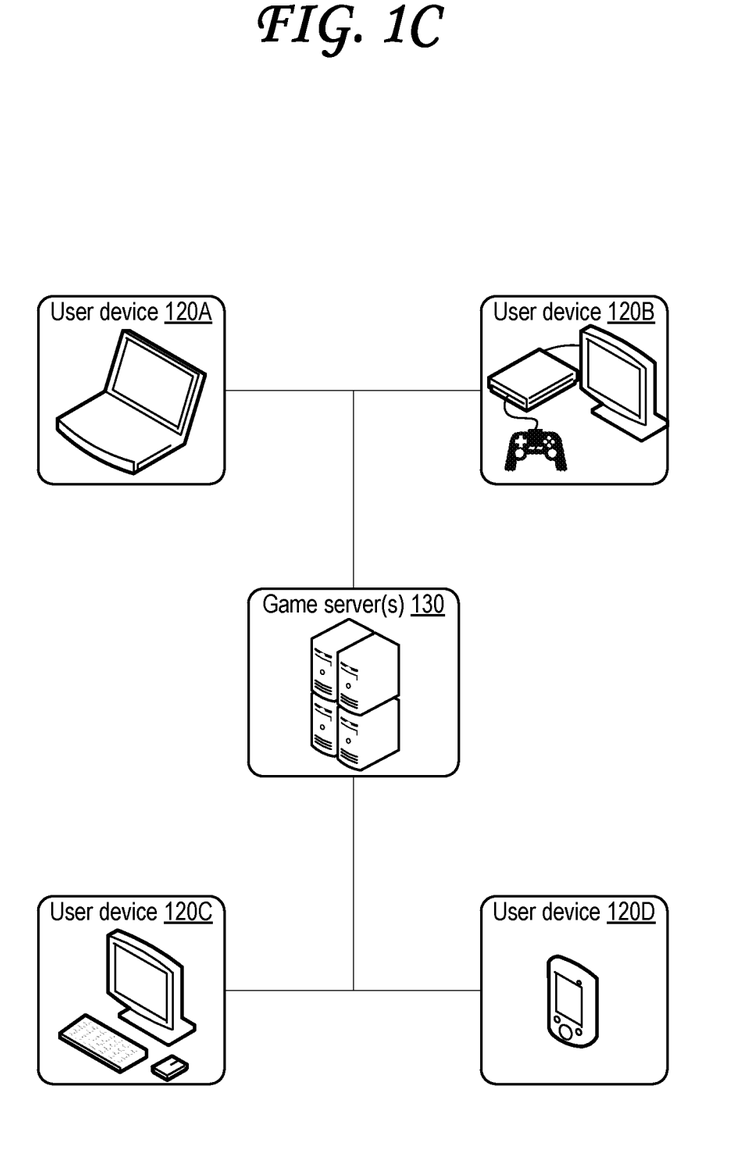
FIG. 1C illustrates an online network multiplayer game environment based on four devices connected by one or more game servers.

FIG. 1C illustrates an online network multiplayer game environment based on four devices connected by one or more game servers.

The online network multiplayer of FIG. 1C includes four user devices 120 that are each connected to one or more game server(s) 130 via an internet connection and playing a multiplayer game. The internet connection of any of the user devices 120, may optionally be provided by a network router 125 (not shown) and may run through other routers, switches, servers, and other network hardware on the way to and from the game server(s) 130.

The four user devices 120 of FIG. 1C include a laptop 120A, a home video game console 120B, a desktop computer 120C, and a mobile device 120D. It should be understood that other online network multiplayer game environments may include a different number of user devices 120 and/or network hardware, and that any of these user devices 120 may be any type of computer system 600, or any device having at least a subset of the components illustrated or described with respect to FIG. 6. Some games may require a particular type of user device 120. The user devices 120 and game server(s) 130 may include wired connection capabilities via Ethernet connections, wireless connection capabilities via 802.11 Wi-Fi connections, or some combination thereof. In some cases, the game server(s) 130 may be missing, and the user devices 120 may connect directly with each other over the internet without any central game server(s) 130 moderating the game. In some cases, one of the user device 120, such as the one that initiated the multiplayer game, can act as a game server 130. Game server(s) 130 may be used to offload some processing tasks from the user devices 120 in the online multiplayer game environment to speed up gameplay, and to prevent players from cheating or using pirated or modified game software.

Players playing a multiplayer game in an online network multiplayer game environment are typically all running copies of the same game on each user device 120, with various actions taken by the players communicated directly from each user device 120 to the other user devices 120, optionally through the game server(s) 130. Actions of each particular player may be tracked as discussed with respect to FIG. 1B, though in an online network multiplayer game environment, these tracked actions for each player may be stored by the game server(s) 130 and/or by multiple user devices 120, in case one of the user devices 120 is suddenly disconnected. This prevents the tracked data for any given player from being lost.

A player in an online network multiplayer game environment can sometimes be forced to exit a game or stop providing inputs for a variety of reasons, such as any of the reasons described above with respect to the local network multiplayer game environment.

If a particular player exits the game, triggers an "autopilot mode," or otherwise stops providing inputs, the game server(s) 130 and/or the user device(s) 120 remaining in the online network multiplayer game environment can automatically pause the game. Alternately or additionally, the game server(s) 130 and/or the user device(s) 120 remaining in the online network multiplayer game environment can interpret this as a "simulation indication" causing the user device(s) 120 remaining in the local network multiplayer game environment to automatically launch a "simulation mode" by taking over the role of the player who exited or otherwise stopped providing inputs to the multiplayer game. The game server(s) 130 and/or the user device(s) 120 remaining in the online network multiplayer game environment can go one step further by using the tracked action information associated with the missing player to guide the simulation to use similar in-game behaviors to the missing player.

With regard to simulating the missing player, the game server(s) 130 and/or the user device(s) 120 remaining in the online network multiplayer game environment may use similar techniques to those described with respect to FIG. 1A or FIG. 1B as being performed by the home video game console 110 of FIG. 1A or the remaining user device(s) 120 of FIG. 1B. In this case, however, the games server(s) 130 and/or the user device(s) 120 remaining in the online network multiplayer game environment may also be driving the simulation of that player, particularly if the user device 120 of the player who is being simulated has been disconnected or has quit the game. Even if the user device 120 of the player who is being simulated has not been disconnected or has not quit the game, it is safe to assume that it may be disconnected or may quit the game at any time if the user has stopped providing inputs. Simulation processes are further illustrated and described in the flow diagrams of FIG. 2, FIG. 3, FIG. 4, and the respective descriptions thereof.

Figure 2:
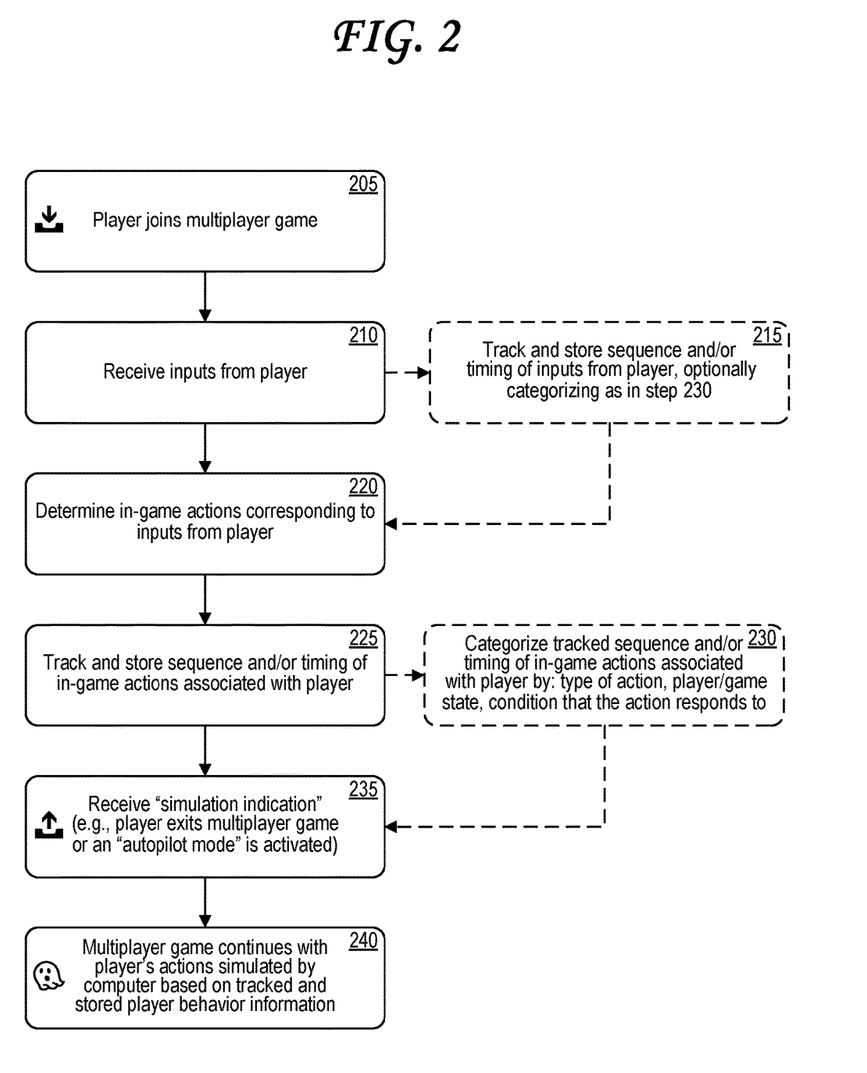
FIG. 2 is a flow diagram illustrating a process for continuing a multiplayer game that has lost a player.

FIG. 2 is a flow diagram illustrating a process for continuing a multiplayer game that has lost a player.

At step 205, a player joins a multiplayer game, either by picking up a controller or other input device in a single-device multiplayer game environment, or by using a user device 120 to connect to a game server 130 and/or one or more other user devices 120 in a local network multiplayer or an online network multiplayer game environment.

At step 210, manual inputs are received from the player himself, either via a controller, a keyboard/mouse, or another input interface associated with user device 120 used. At optional step 215, the user device(s) 120 and/or game server(s) 130 may record the sequence and/or timing these manual inputs as recorded directly from the human player, optionally categorizing these inputs as explained below with respect to step 230.

At step 220, the user device(s) 120 and/or game server(s) 130 determine the appropriate in-game actions corresponding to the inputs of the player that were received at step 210 and optionally tracked/stored at step 215. For example, in a racing game, the input received from the player maybe a tilting of a joystick to the left at a 45 degree angle, which may be translated at step 220 into a slight turn to the left by the player's vehicle—that is, a slight turn to the left by the by the player's control object.

At step 225, the user device(s) 120 and/or game server(s) 130 track and store the actions of the player, and may in particular track and store sequence and/or timing of those actions. At optional step 230, the user device(s) 120 and/or game server(s) 130 may categorize the actions, actions sequences, and action timings of step 225. For example, these actions/sequences/timings may be categorized by a type of action taken, by a player state at the time of the action, by a game state at the time of the action, by a condition that the actions is responsive to, or some combination thereof.

At step 235, the user device(s) 120 and/or game server(s) 130 receive a "simulation indication," meaning that the user device(s) 120 and/or game server(s) 130 have received some indication that the tracked player has exited the game, that the tracked player has triggered an "autopilot mode," or that the tracked player has otherwise stopped providing inputs to the game. Various potential causes of such a simulation indication are discussed further with respect to different multiplayer game environments in the discussions corresponding to FIG. 1A, FIG. 1B, and FIG. 1C.

At step 230, the multiplayer game continues with the tracked player's actions simulated by the user device(s) 120 and/or game server(s) 130 based on the actions/sequences/timings tracked and stored at step 225 and optionally categorized at step 230, and optionally based on the inputs/sequences/timings tracked/stored/categorized in step 215. Simulation processes are further illustrated and described in the environment diagrams of FIG. 1A, FIG. 1B, and FIG. 1C, and the respective descriptions thereof, as well as by the flow diagrams of FIG. 3 and FIG. 4 and the respective descriptions thereof.

Figure 3:
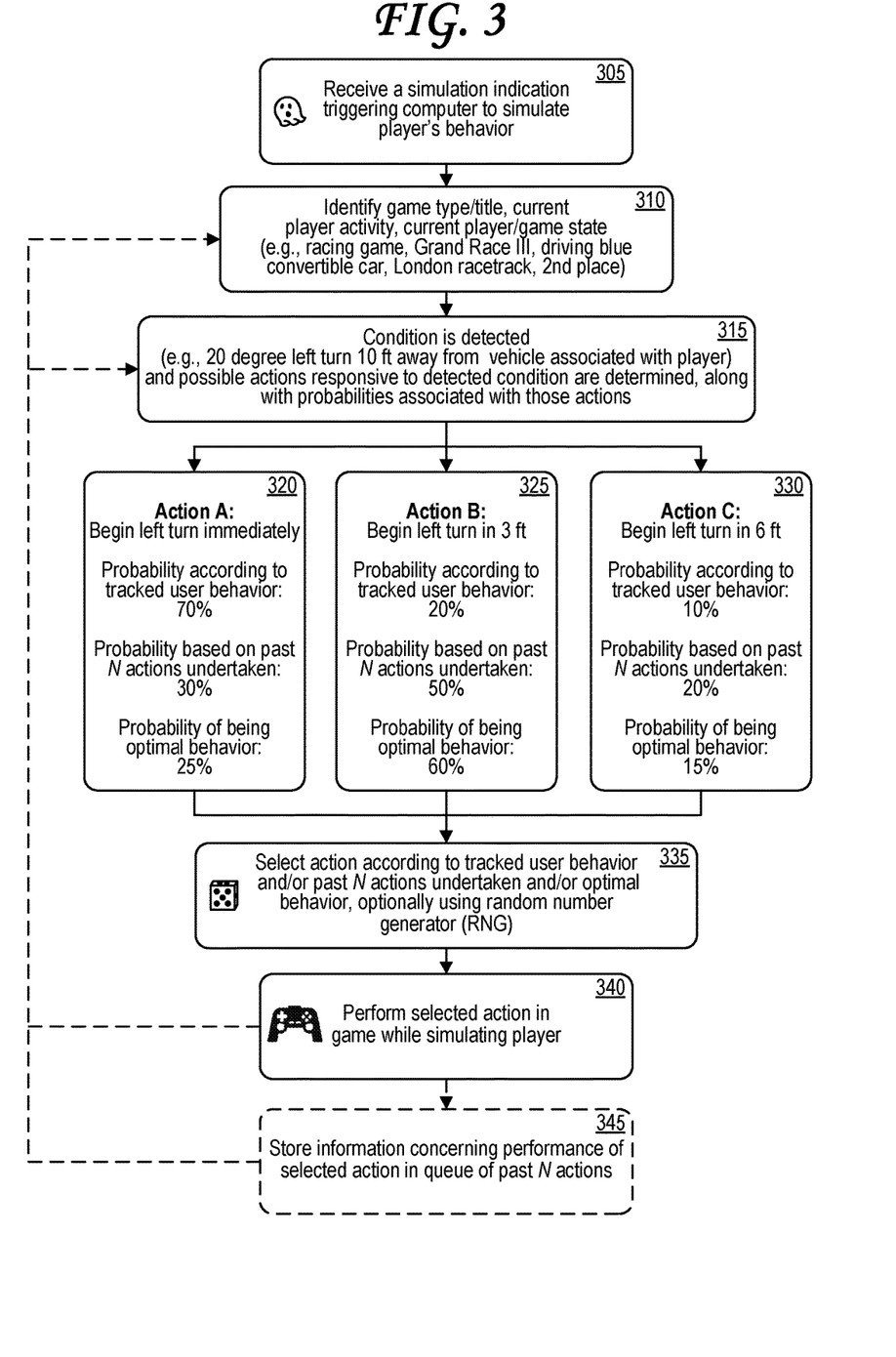
FIG. 3 is a flow diagram illustrating a process for simulating a player action.

FIG. 3 is a flow diagram illustrating a process for simulating a player action.

At step 305, the user device(s) 120 and/or game server(s) 130 receive a "simulation indication" as illustrated and discussed with respect to step 240 of FIG. 2. At step 310, the user device(s) 120 and/or game server(s) 130 simulating the missing player's behavior identify a game type of the multiplayer game being played, a game title, a current player activity of the now-missing player, a current player state of the now-missing player, a current game state of the multiplayer game being played, or some combination thereof. For example, the user device(s) 120 and/or game server(s) 130 may identify at step 310 that the game is a racing game, that the game is titled "Grand Race III," that the player is driving a particular make of blue convertible car, that the current race is on a London racetrack, and that the player is currently in second place.

At step 315, the user device(s) 120 and/or game server(s) 130 simulating the missing player's behavior detect a condition requiring selection of an action. For example, the detected condition may be that the missing player's vehicle is approaching a 20 degree left turn that is 10 in-game feet away from the missing player's vehicle. The user device(s) 120 and/or game server(s) 130 then determine possible actions responsive to the detected condition, and determine various probabilities Three possible actions are illustrated in FIG. 3—Action A 320, Action B 325, and Action C 330. It should be understood that more or fewer actions can be determined in response to different conditions. Three probabilities are determined for each action, namely a probability of taking the action based on tracked user behavior/actions of the missing player in this situation, a probability of taking the action based on the last N actions, and a probability that the action is optimal behavior in this situation.

There may not always be tracked actions corresponding to every combination of conditions, game type, games titles, player states, and game states, but in such cases, the probabilities may be based on tracked actions where at least a predetermined number of categories match, such as game type and condition, but not game title or player/game state. Tracked actions may also be stored and used from previous game sessions by the missing player, including previous multiplayer game sessions or even previous single-player game sessions where the missing player played against computer players.

Action A 320 is to begin the left turn immediately. The probability that the action is optimal behavior in this situation is 25%, indicating that this is likely too soon to begin turning left. The probability of taking the action based on tracked user behavior/actions of the missing player in this situation is 70%, indicating that the missing player tends to turn left too early, at least in this game, while driving this blue convertible car, on this London racetrack, while in second place, or for actions matching some subset of those categories. The probability of taking the action based on the past N actions undertaken is 30%, perhaps indicating that the missing player's vehicle is in a position or driving at a speed that better suits waiting to turn.

Action B 325 is to begin the left turn in 3 in-game feet. The probability that the action is optimal behavior in this situation is 60%, indicating that this is likely to be an optimal time to begin turning left. The probability of taking the action based on tracked user behavior/actions of the missing player in this situation is 20%, indicating that the missing player tends to turn left too early, at least in this or similar situations. The probability of taking the action based on the past N actions undertaken is 50%, perhaps indicating that the missing player's vehicle is in a position or driving at a speed that better suits waiting to turn.

Action C 330 is to begin the left turn in 6 in-game feet. The probability that the action is optimal behavior in this situation is 10%, indicating that this is likely to be too late to begin turning left. The probability of taking the action based on tracked user behavior/actions of the missing player in this situation is 10%, indicating that the missing player does not typically turn too late, at least in this or similar situations. The probability of taking the action based on the past N actions undertaken is 20%, perhaps indicating that the missing player's vehicle is in a position or driving at a speed that suggests that the player might wait too long to begin the left turn.

At step 335, the user device(s) 120 and/or game server(s) 130 simulating the missing player's behavior select an action according to tracked user behavior and/or according to the past N actions undertaken and/or according to the optimal behavior. This may be determined optionally using random number generator (RNG), for example by running a weighted random selection algorithm or a Markov chain algorithm as discussed in relation to FIG. 1A.

At step 340, the user device(s) 120 and/or game server(s) 130 simulating the missing player's behavior command the control object(s) previously controlled by the missing player—in this case, the vehicle previously controlled by the missing player—to perform the action selected in step 335 within the multiplayer game. At this point, the process can return to step 315 if the game "round" is continuing, such as a particular race that is unfinished, or to step 310 if a different game or different game "round" is being started, such as a second race using a different car or different track. The same methods can be used on a selection screen where the missing player would normally pick a control object type, such as a vehicle, or a game type, such as a racetrack, so that the simulation of the missing player is more likely to pick their favorite car, track, and other new game round settings. In other types of games, this concept may be used to have the simulation of the player pick a favorite weapon, pick a favorite character, pick a favorite character class, pick a favorite team, pick a favorite play style, pick a favorite sports play, pick a favorite color, or some combination thereof.

At optional step 345, the user device(s) 120 and/or game server(s) 130 simulating the missing player's behavior track and store the action performed in step 340 in a queue of the past N actions taken by the missing player and/or by the simulation of the missing player. Following optional step 345, the process can return to step 315 or step 310 as described above.

Figure 4:
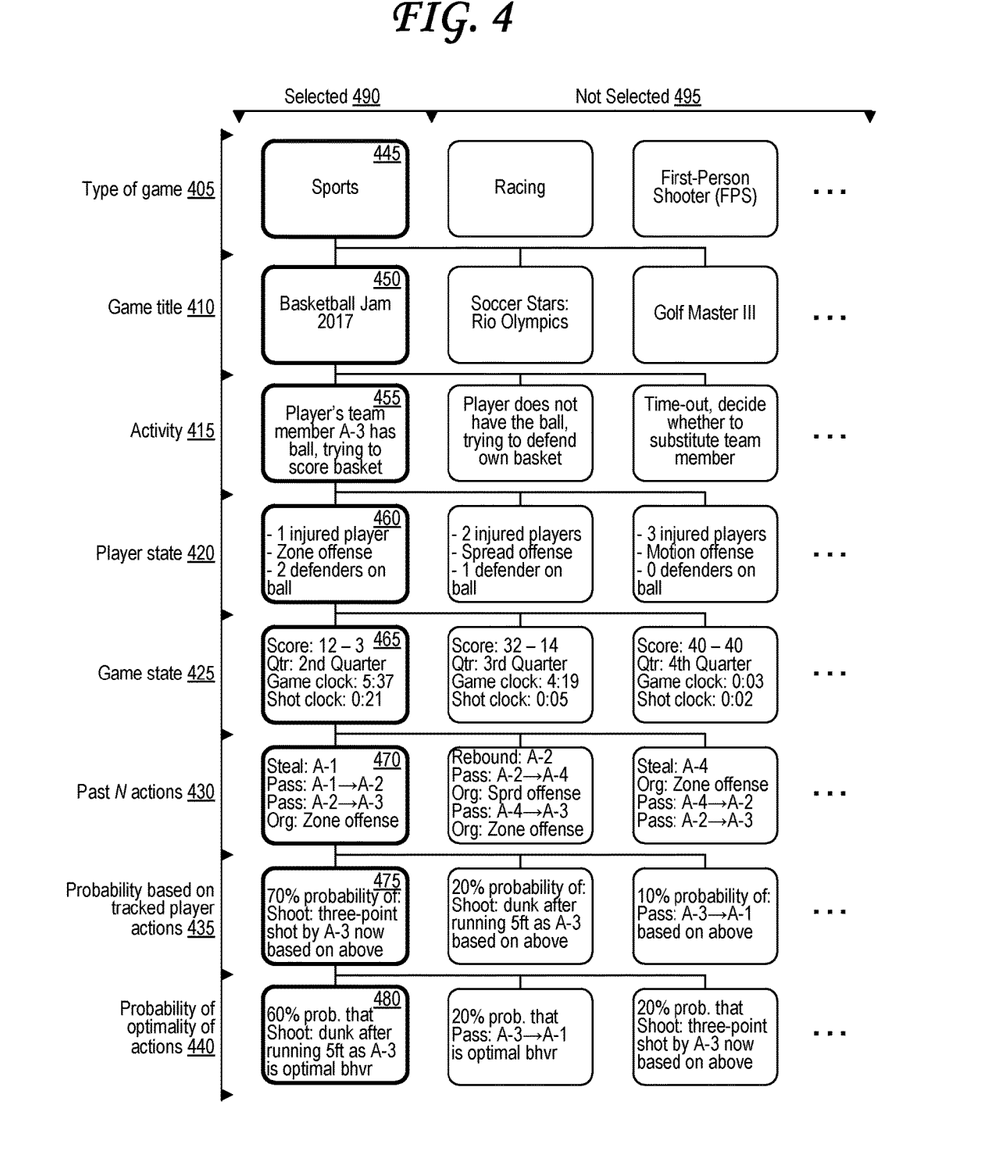
FIG. 4 is a tree diagram illustrating an exemplary data structure for storing game, state, and behavior information.

Simulation processes are further illustrated and described in the environment diagrams of FIG. 1A, FIG. 1B, and FIG. 1C, and the respective descriptions thereof, as well as by the flow diagrams of FIG. 2 and FIG. 4 and the respective descriptions thereof.

FIG. 4 is a tree diagram illustrating an exemplary data structure for storing game, state, and behavior information.

The tree diagram of FIG. 4 is associated with detection of category information as in step 310 of FIG. 3, detection of conditions as in step 315 of FIG. 3, and actions and probabilities as illustrated by actions 320/325/330 of FIG. 3.

The tree diagram of FIG. 4 includes two columns—a "selected" column 490 showing a selected or detected option, state, or choice—and a "not selected" column 495 showing other options, states, or choices that were not selected or detected as true.

The first row of the tree diagram of FIG. 4 shows a "type of game" 405, which might be detected in step 310 of FIG. 3. The detected type of game 405 in FIG. 4 is "sports" 445, and the other types include "racing" and "first-person shooter (FPS)."

The second row of the tree diagram of FIG. 4 shows a "game title" 410, which might be detected in step 310 of FIG. 3. The detected game title 410 in FIG. 4 is "Basketball Jam 2017," and other game titles in the sports game type 445 include "Soccer Stars: Rio Olympics" and "Golf Master."

The third row of the tree diagram of FIG. 4 shows an "activity" 415, which might be detected in step 310 of FIG. 3. The detected activity 415 in FIG. 4 is "Player's team member A-3 has the ball, and is trying to score a basket." Other game activities associated with "Basketball Jam 2017" 450 include "Player does not have the ball, trying to defend own basket" and "Time-out, decide whether to substitute team member."

The fourth row of the tree diagram of FIG. 4 shows a player state 420, which might be detected in step 310 of FIG. 3. The detected player state 420 in FIG. 4 is "1 injured player, team organized in zone offense, and 2 defenders on player holding the ball." Other game activities associated with "Basketball Jam 2017" 450 and/or the activity 445 include "2 injured players, team organized in spread offense, and 1 defender on player holding the ball" and "3 injured players, team organized in motion offense, and 0 defenders on player holding the ball."

The fourth row of the tree diagram of FIG. 4 shows a game state 425, which might be detected in step 310 of FIG. 3. The detected game state 425 in FIG. 4 is "12-3 score, second quarter, game clock reads 5:37, shot clock reads 0:21." Other game activities associated with "Basketball Jam 2017" 450 and/or the activity 455 include "32-14 score, third quarter, game clock reads 4:19, shot clock reads 0:05" and "40-40 score, fourth quarter, game clock reads 0:03, shot clock reads 0:02."

The fifth row of the tree diagram of FIG. 4 shows a queue of the past N actions 430 performed by the control object—here, the basketball team—previously controlled by the now-missing player and now controlled by the simulation of the missing player. This might be detected in step 310 or step 315 of FIG. 3. The detected queue of the past N actions 430 in FIG. 4 is "Steal performed by team member A-1, pass performed from team member A-1 to team member A-2, pass performed from team member A-2 to team member A-3, and team commanded to organize into zone offense." One alternate potential queue of past N actions 430 could include, for example, "Rebound captured team member A-2, pass performed from team member A-2 to team member A-4, team commanded to organize into spread offense, pass performed from team member A-4 to team member A-3, and team commanded to organize into zone offense." Another alternate potential queue of past N actions 430 could include, for example, "Steal performed by team member A-4, team commanded to organize into zone offense, pass performed from team member A-4 to team member A-2, and pass performed from team member A-3 to team member A-3."

The fifth row of the tree diagram of FIG. 4 shows probabilities determined based on tracked actions/behavior by the now-missing player 435. This might be calculated in step 310 or step 315 of FIG. 3, and corresponds to the probabilities illustrated in actions A/B/C 320/325/330 of FIG. 3. The highest probability 475 based on tracked player actions is probability 475, which indicates that there is a 70% probability that the missing player would have performed a three-point shot immediately using team member A-3 based on the information detected in step 310. Other probabilities indicate that there is a 20% probability that the missing player would have commanded team member A-3 to run 5 in-game feet and then dunk the ball, and that there is a 10% probability that the missing player would have passed the ball from team member A-3 to team member A-1 based on the information detected in step 310.

The sixth row of the tree diagram of FIG. 4 shows probabilities 440 that a particular action is the optimal action for achieving one or more goal(s), which in this case might include scoring a basket in the short-term and winning the game in the long-term. This might be calculated in step 310 or step 315 of FIG. 3, and corresponds to the probabilities illustrated in actions A/B/C 320/325/330 of FIG. 3. The highest probability 480 based on optimality of actions is probability 480, which indicates that there is a 60% probability that commanding team member A-3 to run 5 in-game feet and then dunk the ball is the optimal move given the information detected in step 310. Other probabilities indicate that there is a 20% probability that commanding performance of a three-point shot immediately using team member A-3 would be the optimal action based on the information detected in step 310. Other probabilities indicate that there is a 20% probability that command passing of the ball from team member A-3 to team member A-1 would be the optimal action based on the information detected in step 310.

Based on rows 430, 435 and 440, then the user device(s) 120 and/or game server(s) 130 simulating the missing player's behavior may make a choice, which may be randomized based on the probabilities of rows 435/440. Probabilities based on row 430 may also be generated, for example using Markov chain algorithms, as illustrated actions A/B/C 320/325/330 of FIG. 3. Based on the probabilities shows in FIG. 4, the action selected is most likely to be either performing a three-point shot immediately using team member A-3 or commanding team member A-3 to run 5 in-game feet and then dunk the ball.

Simulation processes are further illustrated and described in the environment diagrams of FIG. 1A, FIG. 1B, and FIG. 1C, and the respective descriptions thereof, as well as by the flow diagrams of FIG. 3 and FIG. 4 and the respective descriptions thereof.

Figure 5:
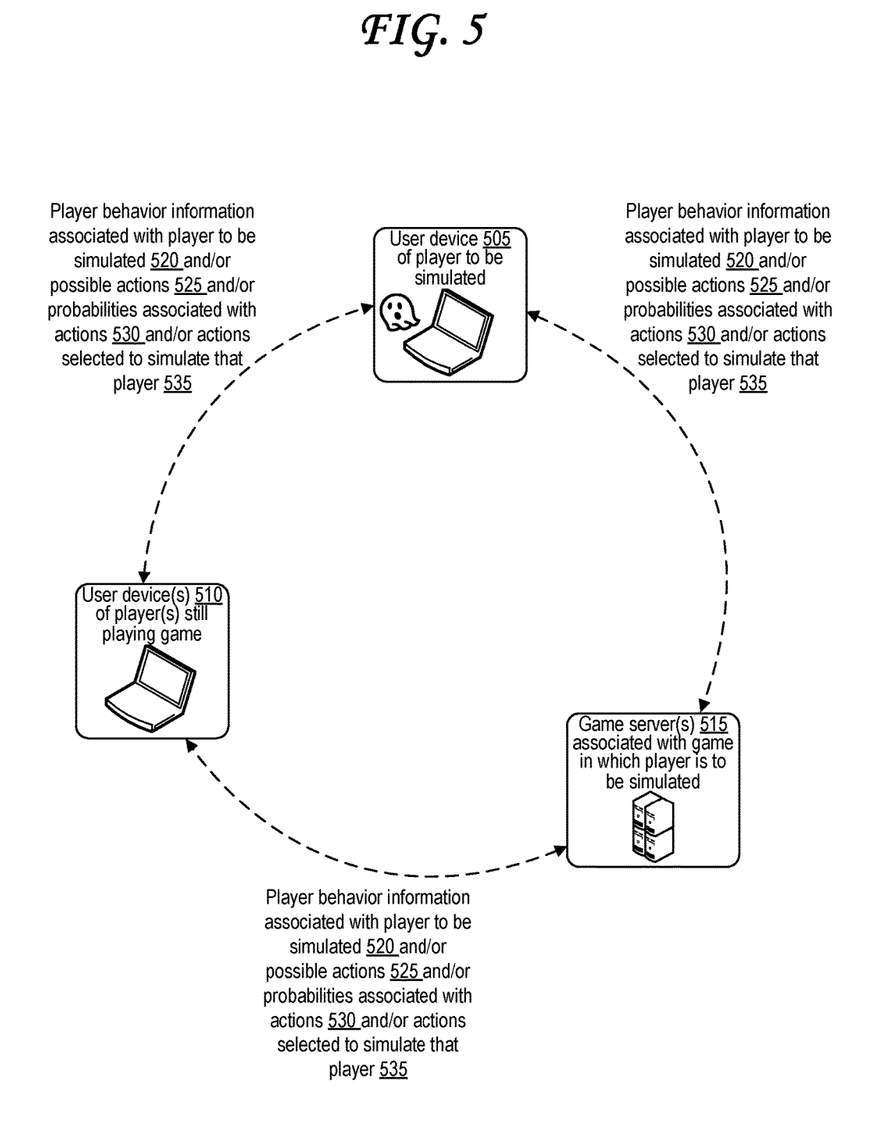
FIG. 5 illustrates a multiplayer game data ecosystem.

FIG. 5 illustrates a multiplayer game data and device ecosystem.

In particular, FIG. 5 illustrates a user device 505 of a player to be simulated, one or more user device(s) 510 of player(s) still actively playing the game, and one or more game server(s) 515 associated with the game in which the player (associated with user device 505) is to be simulated.

Assorted data may be transmitted freely between the user device 505, the user device(s) 510, and the game server(s) 515. This data may include player behavior information associated with player to be simulated 520—that is, tracked user actions from step 215/225/230 and player information and conditions determined at steps 310/315. This data may include possible actions determined at step 315. This data may include the various probabilities determined at step 315 and discussed herein with respect to Actions A/B/C 320/325/330. This data may include the actions finally selected at step 335 and performed at step 340.

It should be understood that the processes described herein may be applied to any genre or type of game, including racing games, adventure games, platformer games, role-playing games (RPGs), action RPGs, tactical RPGs, sandbox RPGs, first-person-shooter (FPS) games, third-person-shooter (TPS) games, strategy games, real-time strategy (RTS) games, turn-based strategy (TBS) games, real-time tactics (RTT) games, turn-bases tactics (TTT) games, tower defense games, fighting games, puzzle games, physics games, educational or "edutainment" games, sports games, simulation games, war games, adventure games, shoot-em-up games, action adventure games, construction games, management games, procedurally generated "rogue-like" games, exploration games, survival games, crafting games, sandbox games, endless runner games, clicker games, stealth games, massively-multiplayer online (MMO) games, music games, party games, programming games, logic games, trivia games, board games, card games, art games, exercise games, artillery games, multiplayer online battle arena (MOBA) games, domination games, and various combinations thereof. In some cases, a player's behavior may be simulated in a multiplayer game even without the player having ever joined the game, for instance when the player is away on vacation or otherwise cannot be reached, and another player wants to play a game against an opponent that simulates the missing player. In some cases, a player's behavior may be simulated in a single-player game as well, such as in any of the situations that may result in a simulation indication as discussed with respect to the gaming environments of FIG. 1A, FIG. 1B, or FIG. 1C.

Figure 6:
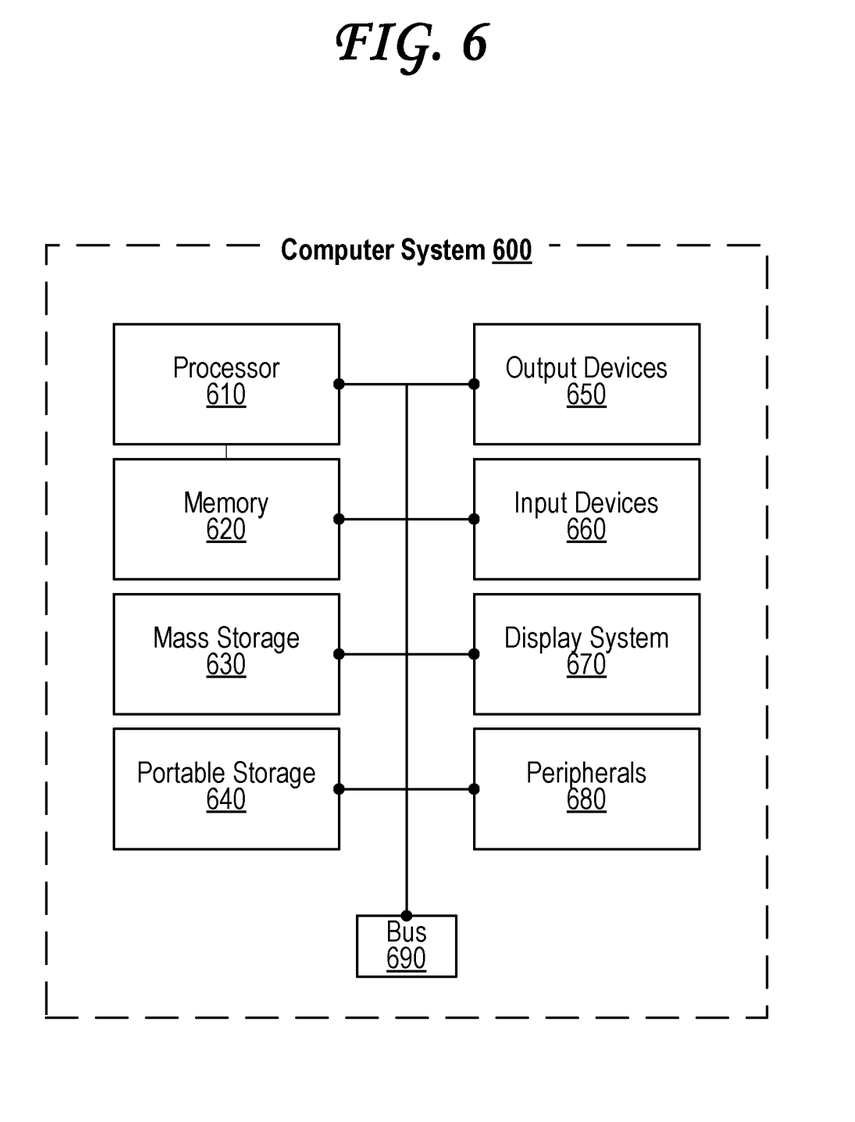
FIG. 6 is a block diagram of an exemplary computing device that may be used to implement an embodiment of the present invention.

FIG. 6 illustrates an exemplary computing system 600 that may be used to implement an embodiment of the present invention. For example, any of the computer systems, game consoles, servers, or computerized devices illustrated or described herein may, in at least some cases, include at least one computing system 600. The computing system 600 of FIG. 6 includes one or more processors 610 and memory 610. Main memory 610 stores, in part, instructions and data for execution by processor 610. Main memory 610 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 610 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 610.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD), a plasma display, an organic light-emitting diode (OLED) display, an electronic ink display, a projector-based display, a holographic display, or another suitable display device. Display system 670 receives textual and graphical information, and processes the information for output to the display device. The display system 670 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 600 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 600 may be part of a multi-computer system that uses multiple computer systems 600, each for one or more specific tasks or purposes. For example, the multi-computer system may include multiple computer systems 600 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 600 from different networks communicatively coupled together via the internet (also known as a "distributed" system).

The present invention may be implemented in an application that may be operable using a variety of devices. Non-transitory computer-readable storage media refer to any medium or media that participate in providing instructions to a central processing unit (CPU) for execution, and that may be used in the memory 620, the mass storage 630, the portable storage 640, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, any other magnetic medium, flash memory, memristor memory, any other solid-state memory, a CD-ROM disk, digital video disk (DVD), blu-ray disk (BDD), or any other optical medium, Random Access Memory (RAM), Read-Only Memory (ROM), programmable read-only memory (PROM), erasable programmable read-only memory (EPROM), electrically erasable programmable read-only memory (EEPROM), FLASHEPROM, Resistive random-access memory (RRAM or ReRAM), Phase Change Memory (PCM), spin transfer torque RAM (STT-RAM), and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various flow diagrams provided and described above may show a particular order of operations performed by certain embodiments of the invention, it should be understood that such order is exemplary. Alternative embodiments may perform the operations in a different order, combine certain operations, overlap certain operations, or some combination thereof.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for simulating game player behavior, the method comprising:
   receiving a plurality of action inputs from a first user device associated with a first player, the action inputs associated with a plurality of action sequences in one or more game titles played by the first player via the first user device;
   storing the plurality of action inputs in association with a respective one of the game titles played by the first player in memory;
   identifying that the first player has triggered a simulation mode during a game session of an identified game title; and
   launching the simulation mode in the game session of the identified game title in response to the identified trigger by:
      identifying a first player state associated with a control object previously controlled by the first player within the game session of the identified game title, wherein the identified first player state includes a current action sequence;
      identifying a condition encountered by the control object;
      identifying a plurality of possible actions to be taken by the control object in response to the condition and the first player state;
      selecting a first action of the plurality of possible actions based on the stored plurality of action inputs associated with the identified game title and based on the current action sequence indicated by the identified first player state; and
      commanding the control object to perform the selected first action within the game session in continuation of the current action sequence.

2. The method of claim 1, further comprising generating optimization-based probability values for the possible actions, each optimization-based probability value identifying a likelihood that the respective one of the plurality of possible actions achieves a goal associated with the control object, wherein selecting the first action is further based on the plurality of optimization-based probability values.

3. The method of claim 1, further comprising storing the first action in a queue of actions performed by the control object.

4. The method of claim 1, further comprising retrieving a stored queue of actions performed by the control object, wherein selecting the first action is further based on the retrieved queue of actions.

5. The method of claim 1, wherein the control object corresponds to one or more characters associated with the first player in the game session of the identified game title.

6. The method of claim 1, wherein the control object corresponds to one or more movable inanimate objects associated with the first player in the game session of the identified game title.

7. The method of claim 1, wherein the plurality of possible actions include a waiting action.

8. The method of claim 1, further comprising commanding a player exit message to be output within the game in response to identification of the trigger, wherein the player exit message indicates that the first player has left the game session, wherein the player exit message is at least one of a textual message, a graphical message, or an audible message.

9. The method of claim 1, further comprising sending the action inputs over a communication network to a second device, and wherein the stored plurality of action inputs are stored in memory of the second device and used to launch the simulation mode.

10. The method of claim 1, wherein identifying the trigger is further based on input from the first player.

11. The method of claim 1, wherein identifying the trigger is based on a simulation indication that is identified when no action input has been received from the first user device for a predetermined period of time.

12. The method of claim 1, wherein the first player state comprises a state associated with membership on a team comprising one or more other players, and wherein at least one of the possible actions is specific to one of the other players on the team.

13. The method of claim 1, wherein the stored action inputs were received as part of one or more previous sessions of the same identified game title.

14. The method of claim 1, wherein the stored action inputs were received as part of at least one game session of a different game title than the identified game title.

15. The method of claim 14, wherein selecting the first action further comprises identifying that the identified game title and the different game title both correspond to a same predefined game category.

16. The method of claim 15, wherein selecting the first action further comprises identifying that the identified game title and the different game title both correspond to a predetermined number of same predefined game categories.

17. The method of claim 1, further comprising:
   generating a plurality of behavior-based probability values for the possible actions based on the stored plurality of action inputs-associated with the identified game title and based on the current action sequence indicated by the identified first player state; and
   assigning weights to each of the possible actions based on the corresponding behavior-based probability values, wherein selecting the first action is further based on the assigned weights as applied by a weighted random selection algorithm.

18. A system for simulating game player behavior, the system comprising:
   a game control interface that receives a plurality of action inputs from a first user device associated with a first player, the action inputs associated with a plurality of action sequences in one or more game titles played by the first player via the first user device;
   a memory that stores instructions and the plurality of action inputs in association with a respective one of the game titles played by the first player; and
   a processor, that executes the instructions to:
      identify that the first player has triggered a simulation mode during a game session of an identified game title, and
      launch the simulation mode in the game session of the identified game title in response to the identified trigger by:
         identifying a first player state associated with a control object previously controlled by the first player within the game session of the identified game title, wherein the identified first player state includes a current action sequence, identifying a condition encountered by the control object, identifying a plurality of possible actions to be taken by the control object in response to the condition and the first player state, selecting a first action of the plurality of possible actions based on the stored plurality of action inputs associated with the identified game title and based on the current action sequence indicated by the identified first player state, and commanding the control object to perform the selected first action within the game session in continuation of the current action sequence.

19. The system of claim 18, wherein the processor executes further instructions to generate optimization-based probability values for the possible actions, each optimization-based probability value identifying a likelihood that a respective one of the plurality of possible actions achieves a goal associated with the control object, wherein selecting the first action is further based on the plurality of optimization-based probability values.

20. A non-transitory computer readable storage medium having embodied thereon a program, wherein the program is executable by a processor to perform a method of simulating game player behavior, the method comprising:

receiving a plurality of action inputs from a first user device associated with a first player, the action inputs associated with a plurality of action sequences in one or more game titles played by the first player via the first user device;

storing the plurality of action inputs in association with a respective one of the game titles played by the first player;

identifying that the first player has triggered a simulation mode during a game session of an identified game title; and launching the simulation mode in the game session of the identified game title in response to the identified trigger by:

identifying a first player state associated with a control object previously controlled by the first player within the game session of the identified game title, wherein the identified first player state includes a current action sequence;

identifying a condition encountered by the control object;

identifying a plurality of possible actions to be taken by the control object in response to the condition and the first player state;

selecting a first action of the plurality of possible actions based on the stored plurality of action inputs associated with the identified game title and based on the current action sequence indicated by the identified first player state; and commanding the control object to perform the selected first action within the game session in continuation of the current action sequence.

* * * * *